UNITED STATES PATENT OFFICE.

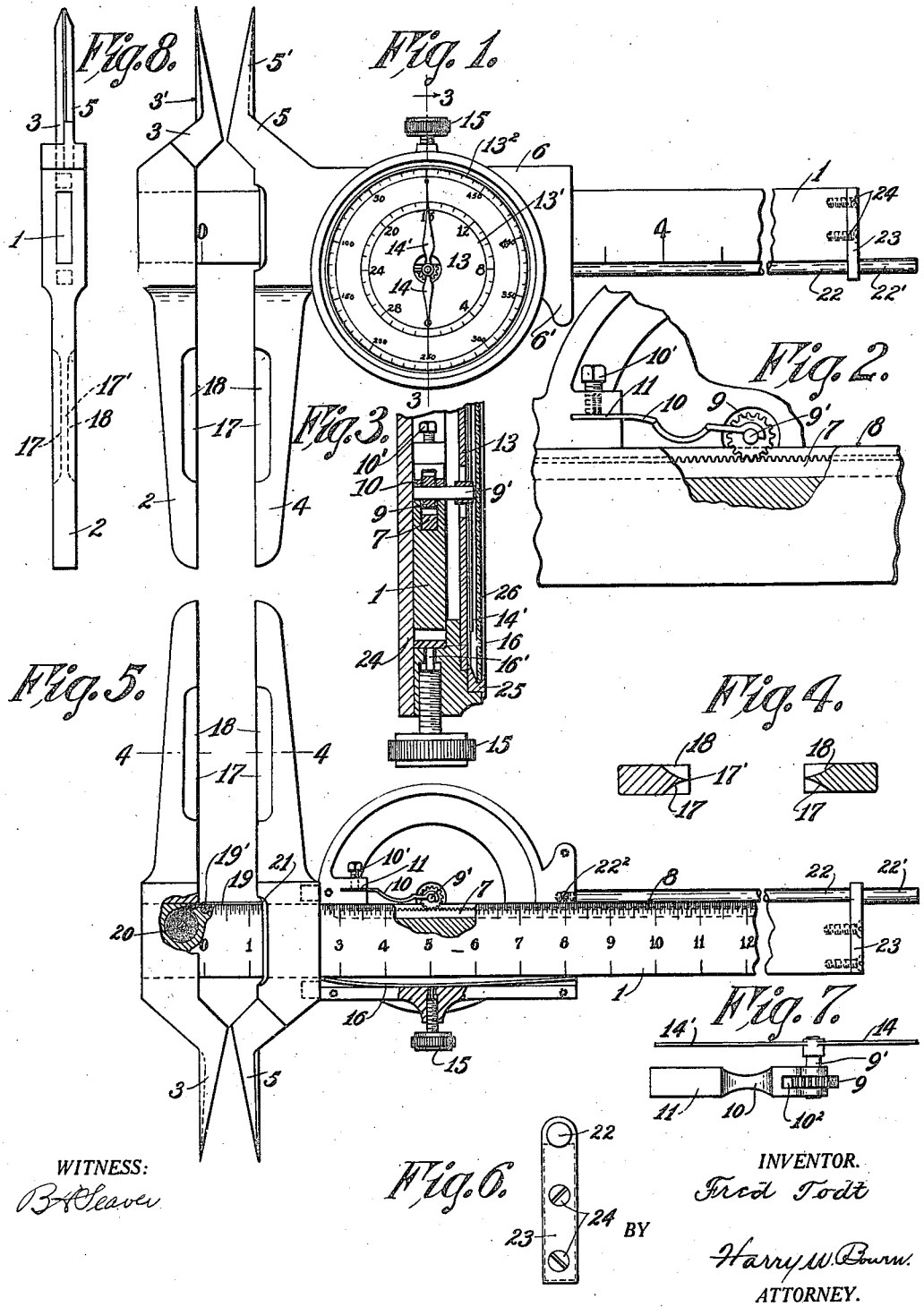

FRED TODT, OF SPRINGFIELD, MASSACHUSETTS.

MEASURING INSTRUMENT.

1,281,715.  Specification of Letters Patent.  Patented Oct. 15, 1918.

Application filed March 28, 1917. Serial No. 158,083.

*To all whom it may concern:*

Be it known that I, FRED TODT, a citizen of the United States of America, residing in Springfield, county of Hampden, and State of Massachusetts, have invented certain new and useful Improvements in Measuring Instruments, of which the following is a specification, being a structure in part of my case, Ser. No. 102,215, filed June 7, 1916.

This invention relates to improvements in measuring instruments, particularly of the type in which a caliper construction is employed in making both inside and outside measurements. Associated with the arms of the caliper is a slide which is adapted to be moved back and forth over the graduated bar of the instrument. Mounted on and carried by this slide are rotatable pointers which are located over a graduated dial on the slide and designed to indicate the extent of movement of the slide on the graduated arm.

An object of the invention is to provide means for supporting the pointers in an elastic or flexible manner, whereby the pinion which turns the pointers, which meshes a rack on the bar will be normally held in engagement therewith, so that the pointer will always accurately indicate the position of the movable slide with reference to its position on the bar, and also the distance the caliper jaws are opened. A further object of the invention is to provide a device for automatically closing or covering the rack as the slide is moved outward along the bar, so that small particles of metal and other foreign articles are prevented from gaining access to the teeth of the rack and possibly injuring the same and cause the pointers to inaccurately indicate the position of the slide. A further object of the invention is to provide a depth gage which is associated with the movable slide for the purpose of measuring the depth of a recess or other portion of an article that may be normally inaccessible when the ordinary means of measurement are employed. A further object is to provide the adjacent inner portions of the jaws of the caliper with beveled edges to permit taking measurements, for example, of a thread at the root portion thereof. A further object of the invention is to provide means for fixedly clamping the slide to the bar after the workman has obtained the measurements required as the inside or outside measurements of an article or has adjusted the slide for depth measurement. A further object is to provide a spring device for always causing the caliper jaws of the slide to exert the same pressure on the object being measured, or, in other words the spring device serves as an adjusting screw. A further object is to provide means for retaining the outer end of the graduated bar elevated to prevent injury to the instrument. These and other objects will appear in the body of the specification and will be particularly pointed out in the claims appended thereto.

Referring to the drawings:

Figure 1 is a side elevational view, substantially full size and showing the graduated bar-member broken away and indicating the caliper jaws in an open position after they have been moved to indicate a space of one half inch;

Fig. 2 is an enlarged detail view of a portion of the graduated bar, partly in section and showing the rack on the bar and the adjustable spring means carried by the slide for mounting the pinion that engages the rack and to the shaft of which the pointers are secured;

Fig. 3 is an enlarged detail sectional view on the line 3—3 of Fig. 1, looking in the direction of the arrows and clearly indicating the construction on this plane;

Fig. 4 is a transverse sectional view on the line 4—4 of Fig. 5, taken through the caliper jaws of the instrument which are used for outside measurements and showing the sharp or beveled edges;

Fig. 5 is a view similar to Fig. 1 but showing the reverse side of the instrument with the cover plate which protects the pinion removed to illustrate the pinion mounting;

Fig. 6 is a detail end view of the supporting piece on the end of the graduated bar and for mounting the rod for depth measurement;

Fig. 7 is an enlarged detail view of the spring, the pinion and the attached pointers;

Fig. 8 is an elevational view of Fig. 1 looking from the left.

Referring to the drawings in detail: The graduated bar of the instrument is indicated at 1, the lower edge of which is suitably graduated in inches and the reverse side into millimeters as shown in Fig. 5. Fixedly secured to the outer end of the bar 1 are the caliper jaws 2 and 3. Slidably mounted on the bar 1 are the caliper jaws 4 and 5 and formed integral with the jaws 4 and 5 is a slide 6 which is suitably recessed to receive the bar 1. Formed by milling or otherwise in the lower edge of the bar 1 is a groove in which is located the rack 7, the outer ends of the teeth of which rack are normally below the edge 8, as shown in Figs. 2 and 3. Engaging this rack is a pinion 9. This pinion is rotatably mounted on or near the outer end of a spring supporting member 10, the inner end 11 of which is received in a slot of the carrier slide 6, and to which it is secured by means of the set screw 10', as clearly shown in Figs. 2 and 5. The outer end of the spring supporting member 10 is cut out, as shown at $10^2$, Fig. 7, to receive the pinion 9 between its ends. The normal set or tendency of this spring arm is downward or toward the rack 7 in order that the pinion 9 may always be held in engagement with the rack. It is, of course, understood that the tension or stiffness of the spring 10 is sufficient to normally hold the teeth of the pinion to the rack, and yet, not rigid enough to cause the intermeshing teeth to wear as the slide 6 is moved backward and forward on the bar 1. It is noticed that the shaft 9' of the pinion does not rest upon the upper edge 8 of the bar but is slightly above the same. Secured to the slide 6 is a graduated dial 13 which is preferably provided with two concentric scales 13' and $13^2$ over which the two pointers 14 and 14' sweep, which pointers are oppositely located, as shown, and are directly secured to and move with the pinion 9, on shaft 9'. The movement of the slide 6 and pinion 9 over a space of one half of an inch on the bar 1 will cause the pointers to make one complete revolution over the scales. The smaller scale 13' as shown is divided into 32 divisions which reads directly on sixty fourths since the pointer 14 makes one revolution when the slide 6 is moved one half inch on the bar 1, as shown. The outer scale $13^2$, as shown, is divided into five hundred divisions so that the pointer 14' will read directly in thousandths of an inch since the pointer 14' makes one revolution when the slide 6 is moved one half inch on the bar 1. It is, of course, within the scope of my invention to vary the size of the pinion 9 and the divisions on the scale in order to have them read in any desired fractions of an inch. It is noted that the two pointers 14 and 14' are always spaced 180 degrees from each other. This is of advantage because then they will not interfere or overlap in the reading of the instrument and will always read in the same direction. The advantage of having the graduated dial in addition to the graduated bar 1 is that one is a check on the other, by observing the graduations on the bar 1 and the position of the caliper jaws 4 and the slide 6 the same can be checked by the pointers. The reverse side of the bar 1 is graduated in millimeters and can be read directly by the position of the caliper jaws. In order to clamp the slide 6 to the bar 1 after a measurement has been effected the set screw or thumb nut 15 is employed. This nut is located in a threaded opening of the upper edge of the slide 6 and its inner end engages a spring 16 which is normally bowed outward slightly so that the slide can move freely on the bar 1 and when the thumb nut 15 is rotated the pin 16' is forced inward against the spring, which will move the spring against the upper edge of the bar 1 if the instrument is held as shown in Fig. 1, which securely clamps the slide 6 thereto.

The caliper jaws 2 and 4 are for the purpose of measuring the outside dimensions of an object or article and the caliper jaws 3 and 5 are for the purpose of measuring the inside dimensions, as a bored opening or recess. It should be observed that the outer edges 3' and 5' of the jaws 3 and 5 are made of considerable length in order to obtain a large bearing surface and consequently accurate measurements. The jaws 2 and 4 are each formed with under cut edges 17 and 18, as shown in Fig. 4, whereby the sharp inner edges 17' would readily reach the bottom of a groove or thread for the purpose of measuring this part of an article, since it is often necessary to measure the root diameter of the threaded part.

For the purpose of automatically moving the slide with a constant pressure against the object being measured and of protecting the rack 7 against injury or for preventing foreign substance from gaining access and lodging in the teeth of the rack a thin flat metal tape 19 of spring material which is wound into a spiral form is provided, one end of which is attached to the bar 1 by means of a shaft 20 which may, if desired, be held against rotation. The other end of this tape is attached to the slide 6, as indicated at 21, when the slide 6 is drawn outward on the bar 1 this tape will automatically be drawn outward over the roller 19' with the slide and provide a cover for the teeth of the rack 7 as the slide 6 is moved. On the reverse movement of the slide the tape is automatically coiled up again as shown in Fig. 5.

For the purpose of measuring the depth of a recess or other inaccessible part the rod 22 is secured to the slide 6 and passes forward along the lower edge of the bar 1, as clearly shown in Fig. 1. This rod normally covers or protects the teeth of the rack 7. Its outer end passes through an opening in the plate 23 which is secured to the end of the bar 1 by means of the screws 24. As the slide 6 is moved outward the end 22' assumes the position shown in Fig. 5 and the distance that this part 22' projects beyond the plate 23 can be directly read on the graduated bar and the dial 13. The rod 22 is secured in place by means of the set screw 22². The dial 13 is normally protected by means of the removable cover 25 which is provided with a protecting glass 26.

An important feature of my invention is the manner of mounting the pinion 9, whereby it is always normally held in contact with the rack 7 and should any foreign particles, as a piece of metal find lodgment between the teeth the spring 10 would yield sufficiently to permit the pinion 9 to readily rise or step over the piece of metal or other obstruction and yet would not interfere with the correct reading of the pointers 14 and 14'. The spring 10 it will be noticed is adjustably secured to the slide 6 by means of the set screw 10'. The purpose of this adjustment is that in case of wear of the measuring jaws 2 and 4 of the caliper the position of the pinion 9 may be changed so that the pointers 14 and 14' will stand in their zero positions. The width of the plate 23 serves the purpose of preventing the graduated bar 1 from coming into contact with the table or bench when the instrument is laid down since this plate, as shown in Fig. 6, is greater in width than the thickness of the bar 1.

Referring to Fig. 8 which is an end view of Fig. 1 looking from the left, it will be noticed that the inside measuring caliper jaws 3 and 5 slide by on each other in the same manner as the blades of a pair of shears. The advantage of this construction is that they can be made much stronger and the inside measurements are taken on the outer edges of the jaws 3' and 5'. By making them slide by each other and of the same thickness there is less liability of the same becoming bent or rendered inaccurate. It will be noticed further from this view that the caliper jaws are equally spaced from the opposite sides of the bar 1 so that the median line of the jaws will lie in the same plane as the bar 1, as clearly shown in Fig. 8.

It will be seen from this construction that I have provided a measuring instrument which is readily adapted for either inside or outside measurements and one that is readily adapted for measuring the root diameter of a threaded bolt, also one that is provided with movable caliper arms that can be quickly and readily locked to the graduated bar. The instrument is further provided with devices for depth measurement and devices for protecting the rack during the movement of the slide.

The slide 6 is provided with an operating knob 6' to enable the operator to conveniently move the slide back and forth.

It will be noticed that the zero positions of the scales 13' and 13² are opposite each other, as shown, so that the two pointers 14 and 14' start from opposite positions.

What I claim is:

1. In a measuring instrument the combination with a graduated bar and a pair of caliper measuring jaws secured thereto, a slide adapted for movement on the bar and provided with a pair of calipering jaws adapted to coöperate with the first mentioned jaws, a rack on the bar, a single double ended pointer carried by the slide and coöperating means between the pointer and the rack comprising a pinion engaging the rack and to which the single doubleended pointer is attached for indicating the extent of movement of the slide, means for adjusting the pinion for setting the pointer in the zero position, means attached to the slide and movable therewith for indicating the depth or inaccessible portion of an object, as and for the purpose described.

2. In a measuring instrument the combination with a graduated bar, having a slide thereon, coöperating caliper jaws on the bar and slide, respectively, and designed for inside and outside measurements, the bar having a rack, a pinion carried by the slide for engaging the rack, elastic means for supporting and holding the pinion in contact with the rack to permit the pinion to yield outward and away from the rack, and means to permit of adjustment of the position of the pinion with relation to the rack and dial to correct any error in the reading of the instrument, as described.

3. In a measuring instrument, the combination with a graduated bar, of a slide movable thereon, an indicating pointer carried by the slide, a rack and pinion connection between the pointer and the bar, means for yieldingly mounting the pinion on the slide comprising a flexible arm, one end of which is secured to the slide and the other end receives the shaft portion of the pinion, whereby the pinion may yield as the same is moved over the rack, and means attached to the slide for automatically protecting the rack as the slide is moved outward.

4. In a measuring instrument the combination with a graduated bar having caliper jaws attached thereto, and an inlaid rack on one edge, a slide mounted thereon and having caliper jaws thereon, means carried by the slide and engaging the rack for indicating the position of the same with relation to the bar, a rod attached to the slide located over the rack to protect the same, said rod being movable therewith and having its outer end projecting beyond the end of the bar for the purpose of measuring the depth of a recess, as described.

5. In a measuring instrument, the combination of a graduated bar, one edge of which is provided with a rack, a slide mounted on the bar and carrying a pinion for engagement with the rack, a pointer secured to the pinion, a tape for protecting the rack as the slide is moved outward, one end of the tape being attached to the slide and the other end to the bar, whereby the tape automatically covers a portion of the rack when the slide is moved outward, and means to automatically rewind itself as the slide is moved inward, as described.

6. In a caliper measuring instrument, the combination with a graduated bar, to which a pair of caliper jaws is attached, a slide on the bar and having caliper jaws coöperating with the first named jaws, means comprising a single double-ended rotatable pointer on the slide to indicate the movement of the latter, means for operating the pointer comprising a rack on the bar and pinion carried by the slide, said pinion being mounted to permit the pinion to yield in opposite directions, and means by which the mounting of the pinion is adjustable to adjust the pinion longitudinally of the rack, and means for locking the slide.

7. In a measuring instrument the combination, with a graduated bar, a plate secured directly on its outer end to elevate the same, and provided with an opening therethrough, a pair of oppositely extending caliper jaws secured to said bar, a slide adapted for movement on the bar and carrying a pair of oppositely extending caliper jaws coöperating with the first named jaws, said jaws being designed for inside and outside measurements, respectively, one of the pair of coöperating jaws having their adjacent edges under cut for measuring the diameter of a grooved portion, means on the slide for indicating the extent of movement of the slide with relation to the bar, means for operating the indicating means, and means attached to the slide for depth measurements, and extending through the opening in the plate and extending through the said plate.

8. A measuring instrument comprising in combination with a graduated bar, having caliper jaws attached thereto, a movable slide on the bar, caliper jaws on the slide, a rack on the bar, a pinion on the slide for operating a double ended pointer, means for automatically covering the rack on the bar as the slide is moved outward and a rod secured to the slide and movable beyond the end of the bar for depth measurement, said rod being located over the rack for protecting the same.

9. In a measuring instrument the combination with a graduated bar having caliper jaws at one end, of a movable slide on the bar and having caliper jaws attached thereto, and means connected to the bar and slide for automatically moving the slide with a constant pressure against the object to be measured.

10. A mounting for a pinion in a measuring instrument, comprising, in combination, a graduated bar, having a fixed rack, a slidable member thereon, a spring formed with a cupped or concavo-convex shaped end to receive and carry a shaft of the pinion, and means for adjustably attaching the spring to the slidable member, said pinion being designed for operating a pointer, and for engagement with the fixed rack on said bar.

11. The combination with a graduated bar of a measuring instrument, a rack on the bar, a pinion engaging the rack, a slide on the bar, a spring adjustably secured to the slide and having its free end cupped to receive the shaft of the pinion, said spring serving to always maintain the pinion in engagement with the rack for the purpose described.

FRED TODT.